Dec. 19, 1950 R. I. HAKOMAKI 2,534,866
BALLOON LOAD RELEASE
Filed Nov. 23, 1949 3 Sheets-Sheet 2

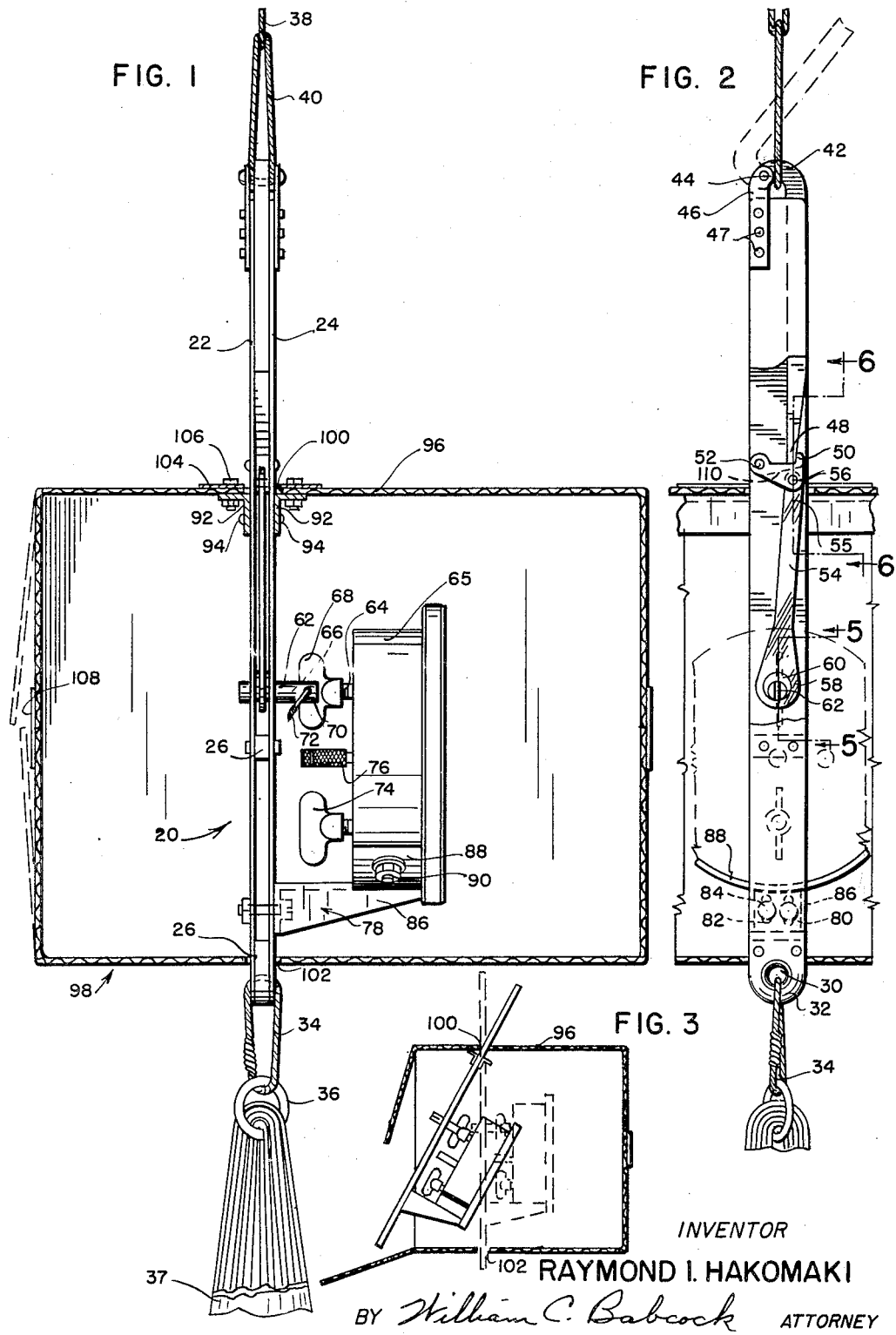

INVENTOR
RAYMOND I. HAKOMAKI
BY *William C. Babcock*
ATTORNEY

Dec. 19, 1950 R. I. HAKOMAKI 2,534,866
BALLOON LOAD RELEASE
Filed Nov. 23, 1949 3 Sheets-Sheet 3

INVENTOR
RAYMOND I. HAKOMAKI
BY *William C. Babcock*
ATTORNEY

Patented Dec. 19, 1950

2,534,866

UNITED STATES PATENT OFFICE 2,534,866

BALLOON LOAD RELEASE

Raymond I. Hakomaki, Minneapolis, Minn., assignor to General Mills, Inc., a corporation of Delaware Application November 23, 1949, Serial No. 129,123

6 Claims. (Cl. 161—1)

The present invention pertains to a balloon load release, and more particularly to a balloon load release mechanism designed for accurate and efficient operation at extremely high altitudes.

In extremely high altitude or stratosphere balloon flights it has been customary and necessary to provide some means for automatic release of the load from the balloon at the end of a predetermined time. A parachute attached to the load then controls the descent of the load and prevents injury to the recording instruments and other apparatus constituting a normal part of such load. The problem of providing a satisfactory release mechanism between the load and balloon is not particularly difficult in connection with low altitude flights. It was found, however, that at the extremely high altitudes encountered in stratosphere balloon flights, the known release devices were unreliable in action.

Electrical release devices which depended upon batteries as a source of power could not be used effectively because of the adverse effect of the very low temperatures upon the life of the batteries. The use of explosive or blasting charges to break the connection between the balloon and its load also proved unreliable at the high altitudes and low temperatures encountered.

With these defects of the prior art in view, it is accordingly one object of the present invention to provide an improved balloon load release for efficient and reliable operation at high altitudes and low temperatures.

It is another object to provide a balloon load release in which a simple mechanical linkage can be actuated directly and simply with relatively slight force.

Another object is to provide a load release in which the releasing mechanism is operated directly by the unwinding movement of the alarm-winding shaft of an alarm clock.

A further object is the provision of a release mechanism in which the clockwork and latch-releasing parts are protected against the conditions encountered at high altitude.

Still another object is the provision of a balloon load release device which is reliable and accurate in operation, simple in construction, light in weight, and which will remain attached to the load for controlled descent with the load after the connection to the balloon is broken.

Other objects and advantages will be apparent from the following specification in which certain preferred forms of the invention have been described.

In the drawings accompanying this application, wherein like reference characters indicate like parts, Figure 1 is a side view, partly in section, of a balloon load release device according to the invention.

Fig. 2 is a partial front view of a device of Fig. 1 with certain portions broken away for clearness.

Fig. 3 is a schematic view showing the assembly of the device of Figs. 1 and 2 in its protective cover.

Figure 4:
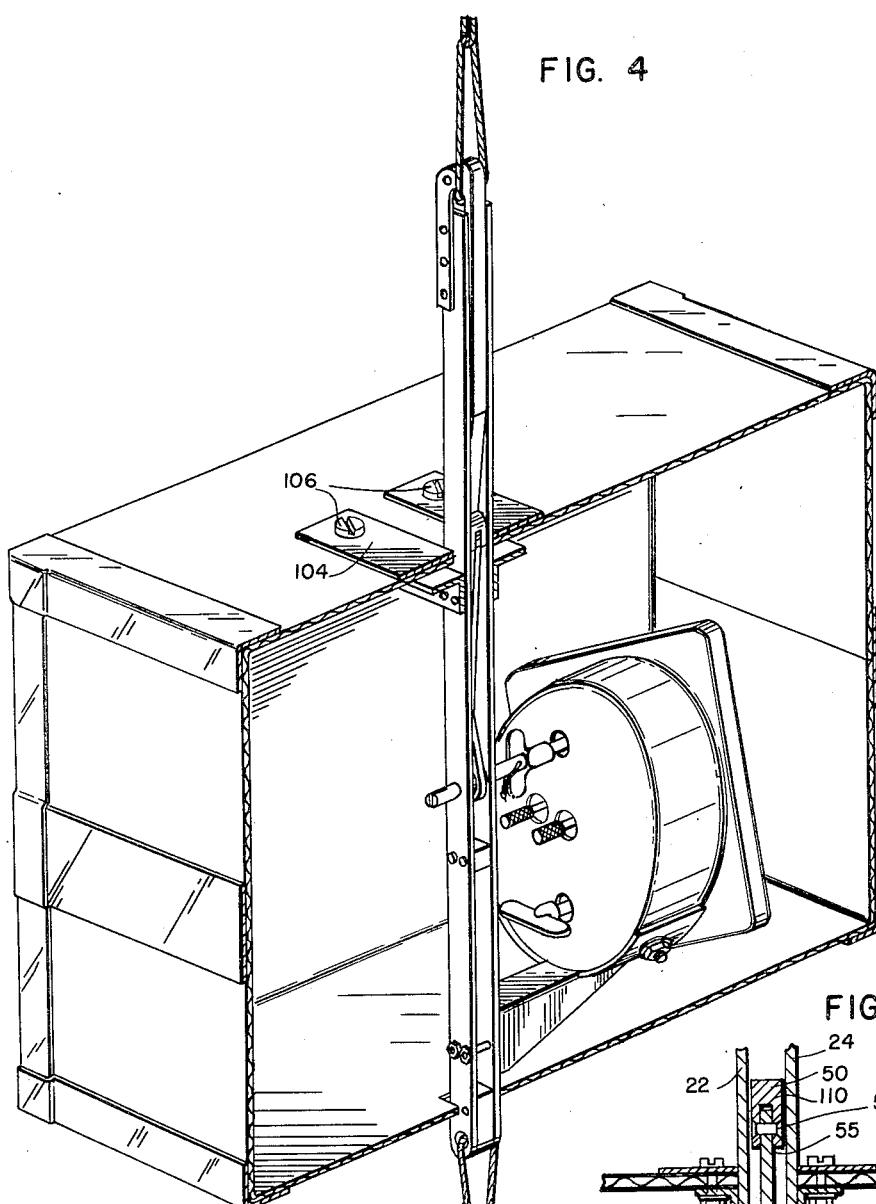
Fig. 4 is a perspective view of the device of the preceding figures, with portions of the protective enclosure broken away for clearness.

As shown in Figs. 1 to 6, the balloon load release device according to the present invention includes a body member designated generally as 20. This body member is preferably made of a pair of spaced longitudinally extending side plates 22 and 24 of aluminum or other light material. Spacers 26 and 28 are fastened between the plates 22 and 24 to maintain them in the proper spaced relationship.

The body member 20 is provided with spaced attachment means for connection to the desired balloon and load respectively. One of the attachment means may be relatively fixed or non-releasable and consists in this case of an opening 30 in the lower end 32 of the body member, plates 22 and 24, and spacer 26. A connecting line 34 is looped between the attachment opening 30 of the release device and the load ring 36 attached to parachute 37 on the load to be carried.

At the opposite or upper end of the body member 20 a releasable attaching means is provided for connection of the body member 20 to the balloon ring 38 through an intermediate connecting loop 40. This attachment means includes a movable hook or retainer 42 which is movably mounted on the upper end of the body member 20 for movement between open and closed positions as shown in dotted lines and heavy lines respectively in Fig. 2. In the form shown in Fig. 2, the retainer 42 is pivoted at 44 on a transverse shaft or axis carried by bearing extensions 46 riveted to the plate members 22 and 24 at 47. A spacer (not shown) between the plates 22 and 24 is held in position by these same rivets to provide the desired separation of the plate members at the upper end of body member 20.

The hook or retainer 42 has a relatively long end 48 which in the closed position of the hook extends downwardly between the plates 22 and 24 to the latched or closed position of Fig. 2. A releasable latch 50 is provided to engage and hold the depending end 48 of retainer 42 in closed position. This latch 50 is also pivoted to the body member 20 on a transverse axis or shaft 52, which in this case is parallel to the axis of pivot 44. Clockwise rotation of latch 50 on axis 52 as viewed in Fig. 2 will thus disengage the latch from the retainer end 48 and permit the retainer 42 to swing to the open or dotted line position of Fig. 2 under the weight of the load. In other words, when the latch 50 is released, the connection between the body member 20 and the balloon ring 38 will be broken and the load will be permitted to drop under the control of parachute 37.

In order to actuate latch 50 to its released position, a connecting rod 54 is provided. The upper end 55 of connecting rod 54 is pivoted at 56 to latch 50. In this case the axis of pivot 56 is also parallel to that of pivots 44 and 52.

The lower end 58 of connecting rod 54 is journaled on an eccentric or cam 60 formed as an integral part of an actuating shaft 62. Shaft 62 is rotatably mounted in the plates 22 and 24 of body member 20 and is, in this case, also parallel to the axes of pivots 44, 52, and 56. Thus releasing means have been provided for latch 50 which will be operative upon rotation of shaft 62 to move the latch 50 out of engagement with retainer end 48 and release the load.

To operate the actuating or cam shaft 62 at the desired predetermined time, I have provided means for driven engagement of the shaft with the alarm-winding key shaft 64 of an alarm clock 65. Alarm clock 65 is of the eight-day type in which the alarm winding shaft rotates when the alarm goes off and the alarm spring is unwinding.

In the present case the connection between the actuating shaft 62 and the alarm winding shaft 64 is provided by a slot 66 in shaft 62, designed for engagement with the winding key 68 on shaft 64. Aligned openings 70 in the shaft 62 and key 68 provide passage for a connecting or locking wire 72 which prevents accidental disengagement of the parts.

Alarm clock 65 includes a separate winding key 74 for the time mechanism of the clock and one or more setting members 76 for the alarm mechanism and time mechanism.

According to the invention, body member 20 is provided with supporting means for mounting the clock 65. Supporting means 78 includes a depending flange 80 having slots 82 through which bolts 84 may pass to clamp the flange 80 against plate 24 of body member 20. Slots 82 permit vertical adjustment of the support 78 in order to obtain proper alignment of the shafts 62 and 64. Supporting means 78 also includes a pair of projecting support flanges 86 which carry a curved supporting platform 88 to which the clock 65 is fastened by suitable bolts 90.

In order that the alarm clock 65 may operate at the high altitudes and low temperatures encountered, it is necessary to degrease completely the clock mechanism and to relubricate it with the thinnest possible lubricant. It is also necessary to provide additional protection for the degreased and relubricated alarm clock and for the main portions of the latch-releasing mechanism previously described.

For this purpose body member 20 is provided with additional supporting members 92, in the form of angular projecting flanges, which are riveted at 94 to the plates 22 and 24. Flanges 92 support the upper wall 96 of a cardboard box member 98 which encloses the operating mechanism. Box 98 is preferably blackened to increase its protective effect under the conditions to be encountered.

The upper wall 96 of the box 98 has an opening 100 through which the upper portion of the release device projects, while the lower wall of the box has a further opening 102 through which the lower end of the body member 20 extends. The manner of assembly of the device within the box is illustrated schematically in Fig. 3 from which it will be indicated that the release device is inserted through an open side of the box with the upper end of body member 20 projecting through opening 100 until the flanges 92 engage the upper wall 96. The box is then sprung slightly at its lower wall portion to permit the release device to be swung from the heavy line position to the dotted line position of Fig. 3 so that the lower end of body member 20 can extend through opening 102. When this assembly is completed, clamping plates 104 are then fastened in position above the upper wall 96 of the box by means of bolts 106 engaging flanges 92. Clamping plates 104 and flanges 92 thus engage the box wall 96 between them and hold the box in the proper vertical position with respect to the remainder of the mechanism. The open end of the box member 98 can then be sealed and taped at 108.

It will be noted that the supporting flanges 92 are located on body member 20 just below the lower end 48 of the movable retainer 42. Thus the major portion of the latch and latch-releasing mechanism is fully protected within the box, while the box will not interfere with free movement of the retainer 42 to its open position.

Figure 6:
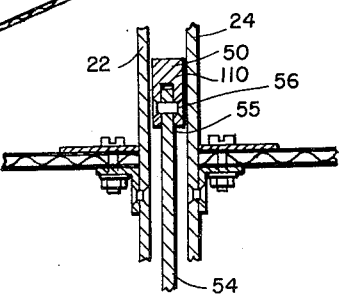
Fig. 6 is a partial sectional view on the line 6—6 of Fig. 2.
Figure 5:
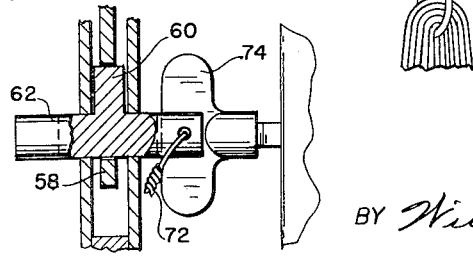
Fig. 5 is an enlarged sectional view on the line 5—5 of Fig. 2.

It will also be noted that the construction shown is one in which the operating parts of the latch mechanism are sheltered and protected between the plates 22 and 24 of the body member. Even the connection between connecting rod 54 and latch 50 is located within these plates as illustrated in Fig. 6. As shown in this figure, the latch 50 is provided with a slot or recess 110 into which the upper end 55 of the connecting rod 54 projects. The cross pin or pivot 56 is recessed in the latch 50 so that all portions of the connection are located between plates 22 and 24.

Thus a construction has been provided in which the moving parts are well protected against the conditions encountered at high altitude and in which the relatively small driving force of an alarm clock spring may be used successfully to actuate the latch-releasing mechanism. The device is relatively simple in construction, light in weight, and has proved efficient in operation.

Figure 7:
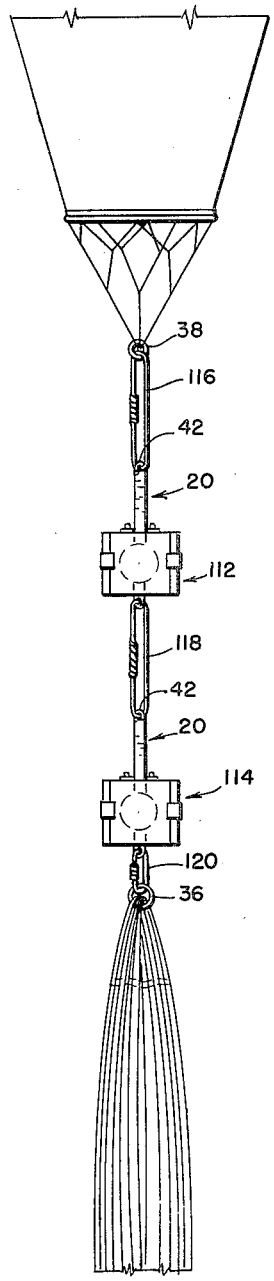
Fig. 7 is a side view showing two release devices of the type shown in the preceding figures connected in series, with the releasable attaching means of one device connected to the fixed attaching means of the other.

In Fig. 7 a balloon load release assembly has been shown in which two load release devices of the type shown in the preceding figures are connected in series, one above the other between the balloon ring 38 and the load ring 36. In this case, the two release devices 112 and 114 are similarly oriented, with the releasable retainers 42 at the upper end of each body member 20. Thus the movable retainer 42 of the upper release device 112 is connected by a line 116 to the balloon ring 38, while the movable retainer 42 of the lower device 114 is similarly connected by a line or loop 118 to the lower end of body member 20 of the upper device 112. Finally, the lower end of the body member 20 of the lower device 114 is connected by an additional line 120 to the load ring 36.

In this construction it is preferable that the alarm in the upper device 112 be set for release slightly ahead of the alarm in the lower device 114. Then if the upper mechanism operates as expected, the connecting line 116 will be released and both timing devices will descend with the load under the control of the chute. If for some unexpected reason the first device 112 does not release the line 116, then, a short time later, the lower device would operate and would release the connecting line 118 between the two load release devices. The use of two such release devices in a single release assembly increases the probability that the load will be released properly at the desired time.

Figure 8:
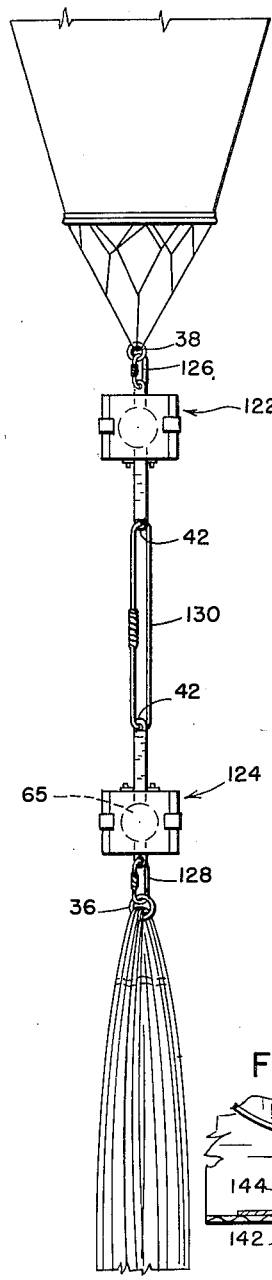
Fig. 8 is a view similar to Fig. 7, but with the releasable attaching means of the respective devices connected to each other.

In Fig. 8 an assembly somewhat similar to that of Fig. 7 is shown with upper and lower timing devices 122 and 124. In this case, however, the upper timing device 122 is inverted so that its movable retainer 42 is connected by an intermediate line 139 to the movable retainer 42 of the lower device. The remaining end of the upper device is connected at 126 to the balloon ring 38, while the lower end of the lower device is connected at 128 to the load ring 36. Here again, the assembly doubles the favorable probability of successful release at the appointed time.

Figure 9:
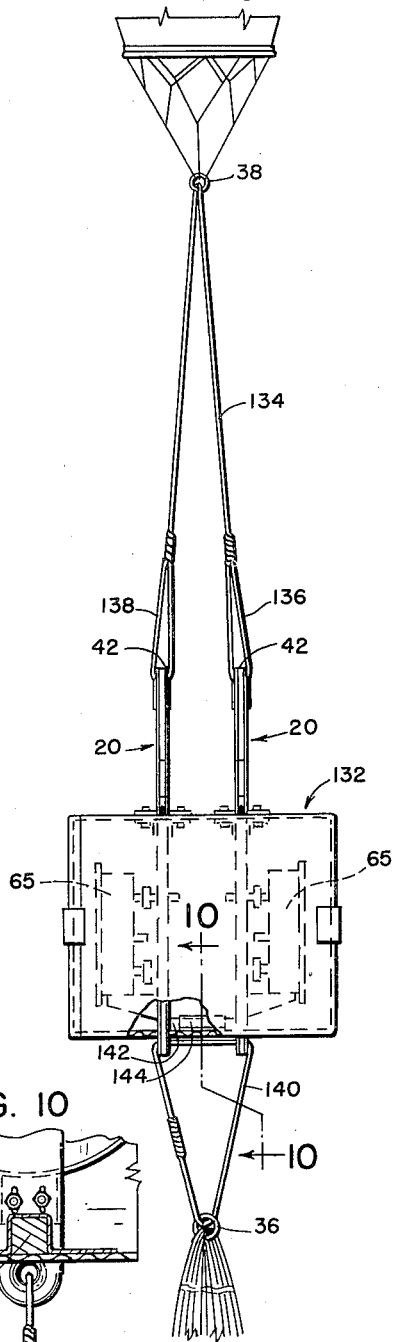
Fig. 9 is a view of a modified construction in which two release devices are arranged side by side within a common enclosure and Fig. 10 is a partial sectional view on the line 10—10 of Fig. 9.
Figure 10:
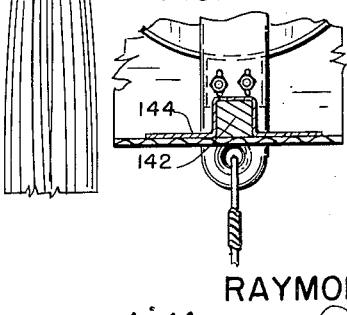

In Fig. 9 a preferred embodiment of the invention is shown in which two release devices are mounted side by side in a single protective cardboard container 132. In this case the details of construction of the individual release devices are the same as those described in Figs. 1 to 4 except that the cardboard container 132 is large enough to include both devices. The two body members 20 are similarly oriented so that the movable retainer 42 of each device is at the top. A connecting line 134 is looped through the balloon ring 38 and has one of its end loops 136 attached to the movable retainer 42 of one of the release devices while its other end 138 is attached to the retainer 42 of the adjacent device. The upper ends of the body members 20 may be inclined toward each other slightly, so that, if extended, they would meet at the balloon ring, in order to avoid deformation under normal load.

At the bottom of the assembly, a single connecting line 140 is looped through the load ring 36 and through the lower ends of the two body members 20.

In this case, in order to resist the tendency of the body members 20 to move toward each other under the longitudinal stress of the load, an additional spacer block 142 may be placed in the container 132 between the lower ends of the two body members. A spacer block 142 may be held in place by tape 144 or other suitable means.

In this case, the two devices are set to release at the same time. It will be apparent that if either one of the devices operates at that time, it will release one end of the connecting line 134 and will permit the line to be pulled through the balloon ring 38 to separate the balloon from the load. In this case also, no matter which of the release devices operates and no matter what the order of their operation may be, the release device will remain attached to the load by the line 140 so that it will be lowered to the ground under the control of the parachute. Thus the hazard of a separately falling member is avoided.

The release device described in the foregoing specification accomplishes the objects set forth at the beginning of this application and provides a useful and highly efficient mechanism which eliminates the failures previously encountered in connection with operation of balloon load release devices at high altitudes.

Since minor variations and changes in the exact details of construction will be apparent to persons skilled in this field, it is intended that this invention shall cover all such changes and modifications as fall within the spirit and scope of the attached claims.

Now, therefore, I claim:

1. A balloon load release device comprising a body member having spaced first and second means for attachment to a balloon and to a load respectively, at least one of said attachment means including a releasable latch, and means for releasing the latch, said releasing means including an actuating shaft rotatably mounted on said member and having means for connection to the alarm winding key shaft of an alarm clock, and supporting means on said member located and arranged with respect to the shaft for mounting an alarm clock with its alarm winding shaft in alignment with said actuating shaft for rotation of the latter to release the latch when the alarm goes off.

2. A balloon release device comprising a body member having spaced first and second means for attachment to a balloon and to a load respectively, at least one of said attachment means including a retainer mounted on said member for movement between open and closed positions, a releasable latch engaging the retainer and holding it in closed position, and means for releasing the latch, said releasing means including an actuating shaft rotatably mounted on said member and having means for connection to the alarm winding key shaft of an alarm clock, and supporting means on said member located and arranged with respect to the shaft for mounting an alarm clock with its alarm winding shaft in alignment with said actuating shaft for rotation of the latter to release the latch and retainer when the alarm goes off.

3. A balloon load release device comprising a body member having spaced first and second means for attachment to a balloon and to a load respectively, at least one of said attachment means including a retainer mounted on said member for movement between open and closed positions, a releasable latch engaging the retainer and holding it in closed position, and means for releasing the latch, said releasing means including a cam shaft rotatably mounted on said member and having means for connection to the alarm winding key shaft of an alarm clock, and supporting means on said member located and arranged with respect to the shaft for mounting an alarm clock with its alarm winding shaft in alignment with said cam shaft for rotation of the latter to release the latch and retainer when the alarm goes off.

4. A balloon load release device comprising a body member having spaced first and second means for attachment to a balloon and to a load respectively, at least one of said attachment means including a retaining hook pivoted to one end of said member for movement between open and closed positions, a releasable latch pivoted to said member and engaging the hook and holding it in closed position, and means for releasing the latch, including an actuating shaft rotatably mounted on said member, an eccentric on the actuating shaft, and a connecting rod having one end journalled on the eccentric and the other end pivoted to the latch to release the latch on rotation of the actuating shaft and eccentric, the actuating shaft having means for driven engagement with the alarm-winding key shaft of an alarm clock, and supporting means on said member located and arranged with respect to said actuating shaft for rigidly mounting the alarm clock with its winding key shaft in aligned engagement with the actuating shaft.

5. A balloon load release device comprising a body member having spaced first and second means for attachment to a balloon and to a load respectively, at least one of said attachment means including a retaining hook pivoted to one end of said member on a first transverse axis for movement between open and closed positions, a releasable latch pivoted to said member on a transverse axis parallel to said first axis and engaging the hook and holding it in closed position, and means for releasing the latch, including an actuating shaft rotatably mounted on said member parallel to said first axis, an eccentric on the actuating shaft, and a connecting rod having one end journalled on the eccentric and the other end pivoted to the latch on an axis parallel to the first axis to release the latch on rotation of the actuating shaft and eccentric, the actuating shaft having means for driven engagement with the alarm-winding key shaft of an alarm clock, and supporting means on said member located and arranged with respect to said actuating shaft for rigidly mounting the alarm clock with its winding key shaft in aligned engagement with the actuating shaft.

6. A balloon load release assembly including a pair of release devices as defined in claim 1 mounted between a balloon ring and a load ring, said devices being mounted side by side in a common protective box supported from said body members, with their latch ends adjacent to each other, and with a line looped through one of said rings and having its ends retained by the respective latches, release of either latch thereby releasing an end of the line for separation of the release devices from said one ring.

RAYMOND I. HAKOMAKI.

REFERENCES CITED

The following references are of record in the file of this patent:

UNITED STATES PATENTS

| Number | Name | Date |
| --- | --- | --- |
| 603,689 | Hill | May 10, 1898 |
| 661,285 | Colt | Nov. 6, 1900 |
| 676,345 | Torras | June 11, 1901 |
| 1,159,622 | Tillery | Nov. 9, 1915 |
| 1,214,843 | Tillery | Feb. 6, 1917 |
| 1,280,074 | Nordenstam | Sept. 24, 1918 |
| 1,635,901 | Oller | July 12, 1927 |
| 1,686,481 | Winder | Oct. 2, 1928 |